March 16, 1965
L. J. LARSEN
3,173,339
POWER CONTROL VALVE
Original Filed Dec. 1, 1958
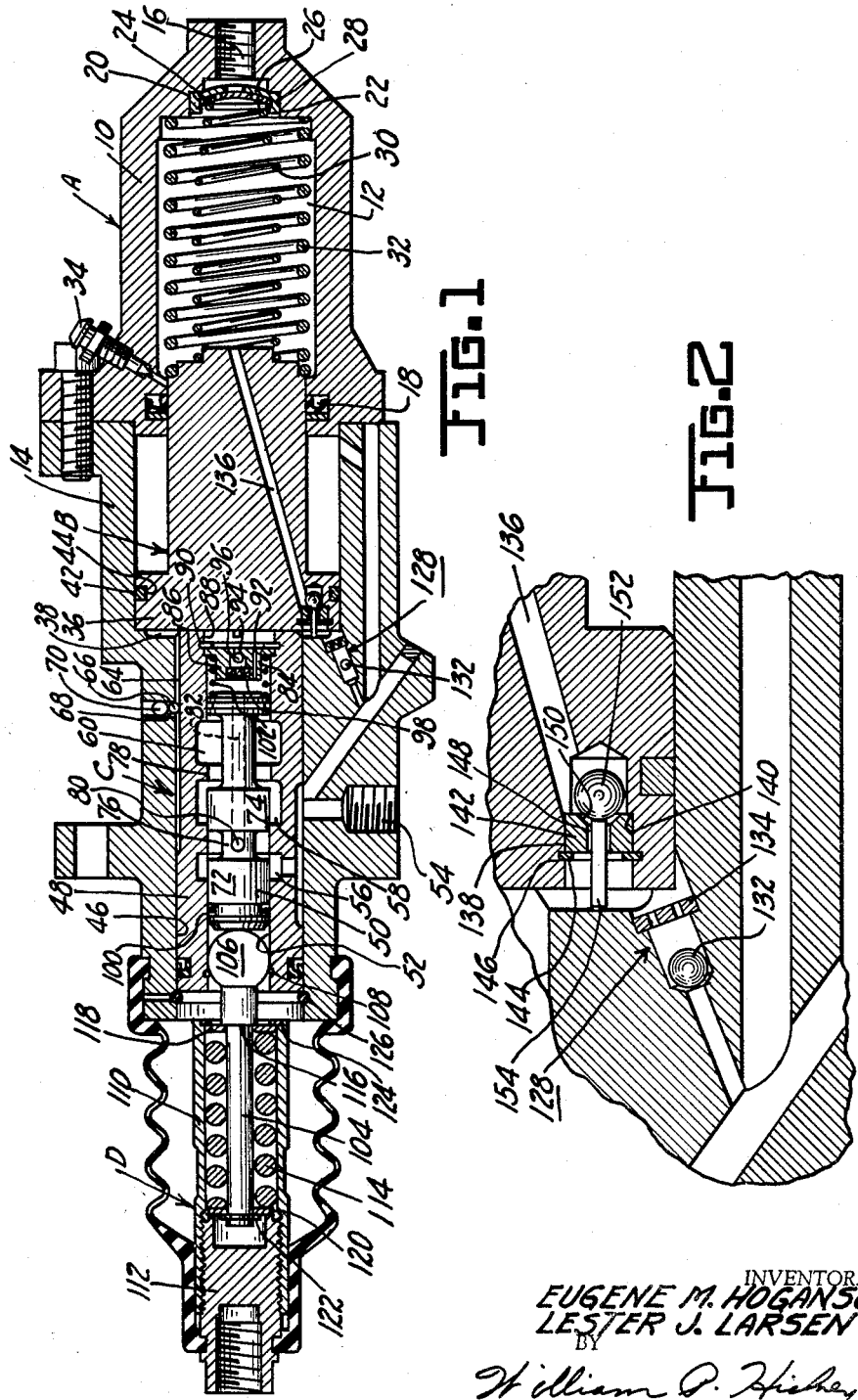
INVENTOR
EUGENE M. HOGANSON
LESTER J. LARSEN
BY
William P. Hickey
ATTORNEY United States Patent Office 3,173,339
Patented Mar. 16, 1965

3,173,339
POWER CONTROL VALVE
Lester J. Larsen and Eugene M. Hoganson, both of St. Joseph, Mich., assignors to The Bendix Corporation, St. Joseph, Mich., a corporation of Delaware
Continuation of application Ser. No. 777,242, Dec. 1, 1958. This application Sept. 28, 1961, Ser. No. 141,463
21 Claims. (Cl. 91—391)

The present invention relates to fluid pressure servomotors of the type which can be actuated manually when no pressure fluid is available to actuate the same; and more particularly to a fluid pressure servomotor of the above described type wherein no follow-up of the servomotor's control member is experienced when pressure fluid is available to actuate the unit, but which automatically provides follow-up when the unit is actuated manually. The present application is a continuation of U.S. application Serial No. 777,242 filed December 1, 1958, now abandoned.

An object of the present invention is the provision of a new and improved fluid pressure servomotor which is caused to operate in the above stated manner by reason of a novel and unique arrangement of its parts.

A further object of the present invention is the provision of a new and improved servomotor of the above described type which is simple in design, rugged in its construction, and inexpensive to be manufactured on a mass production basis.

A still further object of the present invention is the provision of a new and improved arrangement for a fluid pressure motor of the above described type comprising: a power piston, a valve sleeve spaced axially of said power piston, a slide valve in said sleeve for controlling the pressure between the ends of said valve sleeve and spool and said power piston to bias the same away from said power piston, stop limits limiting movement of said sleeve away from said power piston, and valve actuating means including a rod for actuating said slide valve, a second sleeve adapted to abut said valve sleeve and normally spaced a sufficient distance therefrom to accommodate valve actuating movement, and a spring positioned between said rod and said second sleeve which limits the valve actuating force that can be applied to said valve slide before the second sleeve abuts said valve sleeve.

The invention resides in certain constructions, and combinations, and arrangements of parts; and further objects and advantages of the invention will become apparent to those skilled in the art to which the invention relates from the following description of the preferred embodiment described with reference to the accompanying drawing forming a part of this specification, and in which:

FIGURE 1 is a cross sectional view of a fluid pressure servomotor embodying principles of the present invention; and FIGURE 2 is a fragmentary cross sectional view of a portion of the unit shown in FIGURE 1.

The fluid pressure servomotor shown in the drawing is what might be called a power operated master cylinder of a type which is power actuated by means of hydraulic pressure fluid. Although the servomotor unit will have other uses, it is believed to have particular advantages when used to actuate the hydraulic braking system of an automotive vehicle.

The servomotor unit shown in the drawing generally comprises a fluid pressurizing chamber or a master cylinder A from which fluid is displaced by means of a driven movable wall or piston member B, and an axially aligned control valve section C which controls the hydraulic fluid pressure that is supplied to the piston member B when fluid pressure is available, and which automatically drives the piston member B by the manually applied control force when fluid pressure is not available to actuate the piston member B.

The fluid pressurizing chamber A shown in the drawing is formed by means of a master cylinder housing section 10 that is cast with an internal fluid pressurizing chamber 12 therein. The master cylinder housing section 10 is bolted to a servomotor housing section 14 containing the power piston B, and one end of the power piston B projects into the fluid pressurizing chamber 12 to displace fluid therefrom through an outlet opening 16 in the opposite end of the housing section 10. A suitable seal 18 is provided between the piston B and the housing section 10, and a suitable residual pressure check valve structure 20 is provided in a counterbored section of the outlet opening 16 in order to hold a slight positive pressure upon the system actuated by the servomotor units. The residual pressure check valve structure 20 shown in the drawing is of the type shown and described in the Goepfrich Reissue Patent No. 24,664, and for details of its construction and operation, reference may be had to that patent. Suffice it to say that the check valve structure 20 is formed by a dished plate 24 having a membrane 26 tensioned over its outer surface. Suitable offset openings are provided in the plate 24 and membrane 26 so that the openings in the plate will normally be covered by the membrane and such that when fluid is displaced from the chamber 12, the membrane is moved away from the openings in the plate to pass out through the central opening in the membrane 26. The residual pressure check valve structure 20 is normally biased into sealing engagement with the shoulder 28 formed by the counterbored section 22 by means of a coil spring 30 interpositioned between the check valve structure 20 and the end of the piston member B to hold pressure upon the driven system. When the pressure in the chamber 12 drops below the pressure in the driven system by a generally predetermined amount, coil spring 30 yields to permit the check valve structure 20 to move away from the shoulder 28 and thereby permit return flow into the chamber 12 around the outer periphery of the check valve structure 20. The piston member B is normally urged into its normal retracted position shown in the drawing by means of an additional coil spring 32 that is compressed between the end of the piston member B and the opposite end of the fluid pressurizing chamber 12. A conventional bleed screw arrangement 34 is provided in the housing section 10 to remove all air from the pressurizing chamber 12.

As previously indicated, the piston member B is normally adapted to be actuated by means of hydraulic fluid pressure, and accordingly the head end 36 of the piston member that is carried in the servomotor housing section 14 is provided with a cast iron piston ring 42 positioned in a piston ring groove 44 to effect a suitable seal with respect to the cylinder walls of the power chamber 38. Hydraulic pressure is admitted and exhausted from the power chamber 38 by means of the control valve section C which will now be described.

The control valve section C is formed within a bore 46 in the servomotor housing 14, which bore is axially aligned with, and opens into, the power chamber 38. The control valve structure is generaly of the slide valve type; and is formed by means of a valve sleeve 48 slidingly received within the bore 46, and a valve spool 50 that is slidingly received within the longitudinal opening 52 through the valve sleeve 48.

The servomotor unit shown in the drawing is specifically designed to be placed in hydraulic series circuit with an open center power steering unit so that fluid flow from a continually driven pump will be received by the servomotor unit and passed on to the power steering unit without there being created any appreciable back pressure in either the fluid pressure servomotor unit shown in the drawing, or in the power steering unit. Accordingly the control valve structure C is provided with an exhaust connection 54 that communicates with an exhaust groove 56 in the longitudinal opening 52, a pressure connection (not shown) that continually communicates with an inlet groove 58 in the longitudinal opening 52, and a flow through connection (not shown) that is continually in communication with a flow through recess 60 in the longitudinal opening 52. The valve sleeve 48 is adapted to be moved longitudinally of its receiving bore 46 as will later be explained; and in order that the exhaust, and inlet, connections will continually communicate with their respective recesses, longitudinal grooves 62 (only one of which is shown) are spaced around the valve sleeve in an appropriate manner to continually communicate the respective connections with their respective grooves during longitudinal movement of the valve sleeve 48 in the bore 46. In order that the longitudinal grooves will be held in alignment with the respective connections, an additional longitudinal groove 64 is provided in the bore 46 in a manner to receive a portion of a guide ball 66 that projects out of an opening 68 in the housing section 40, and which ball 66 is held in place by another ball 70 that is pressed into opening 68 to effect a seal therefor.

The valve spool 50 is provided with suitable land portions 72 and 74 that are spaced apart by a recess 76 having a width which is less than the spacing between the recesses 56 and 58 in the longitudinal opening 52 of the valve sleeve 48. In the normal position of the valve spool 50, shown in the drawing, land portion 72 uncovers the exhaust groove 56 by an amount which is less than the overlap between the land portion 74 and the inlet recess 56, which land 74 is of such a width as to provide an underlap with respect to the land portion 78 in the longitudinal opening 52 that separates its inlet recess 58 and its flow through recess 60. The recess 76 of the spool 50 is communicated to the face of the piston B in the power chamber 38 by means of a transverse drilling 80 and a longitudinal drilling 82 in the valve spool 50. In the position shown in the drawing, therefore, the exhaust groove 56 will be communicated with the head of the piston member B while the inlet groove 58 is communicated to the flow through groove 60. Inasmuch as the inner edge of the land portion 74 of the valve spool 50 provides an underlap with respect to the sidewall portion 78 of the longitudinal opening 52 between grooves 58 and 60, which underlap is greater in amount than its overlap with respect to the sidewall portion of opening 52 between grooves 56 and 58, which overlap in turn is greater than the underlap of the land portion 72 with respect to the exhaust groove 56, actuating movement of the valve spool 50 towards the power piston B will effect a sequential operation wherein the exhaust groove 56 is first closed off with respect to the control recess 76, the control recess is thereafter opened with respect to the inlet groove 58, and the inlet groove 58 is thereafter closed with respect to the flow through groove 60. At any time, therefore, that the power steering unit that is connected to the flow through groove 60 is being actuated to provide a back pressure, the valve spool 50 need only be longitudinally moved sufficiently to close off exhaust groove 56 and open the control recess 76 to the inlet groove 58 to supply the back pressure created by the power steering unit against the face of the power piston B, and thereby power actuate the servomotor unit. If the power steering unit that is connected to the flow through groove 60 is not being actuated, continued movement of the valve spool 50 toward the power piston B decreases the space between the land portion 74 with the sidewall portion 78 to create a back pressure in inlet groove 58 to thereby supply actuating pressure to the control recess 76 and hence to the face of the power piston B to power actuate the servomotor unit. In order that sudden surges of fluid pressure will not be applied directly to the face of the power piston B, a check valve and orifice arrangement 84 is provided in the longitudinal opening 52 of the valve spool 50 between the end of the valve spool 50 and the power piston B. The check valve and orifice arrangement 84 is formed by means of an automatic screw machine made part 86 that is received in a counterbore 88 and is held in place by snap ring 90. Pressure flow from the valve spool 52 to the face of the power piston B is controlled by a longitudinal orifice bore 92; and in order that fluid can be conducted quickly away from the face of the power piston B, a longitudinal opening 94 that is counterbored to provide a valve seat facing the valve spool 50 for a ball valve 96 is also provided in the part 86. The ball valve 96 is held in place by means of a welch plug 98 having suitable openings therethrough and which is pressed in the counterbore of the opening 94.

A suitable seal 100 is provided between the land portion 72 and the outer end of the valve sleeve 48 and a coil spring 102 is positioned between the inner end of the valve spool 50 and the part 86 to help to bias the valve spool 50 to its normal position shown in the drawing.

Actuation of the valve spool 50 is had by means of a yieldable control link D that abuts the end of the valve spool 50 and projects outwardly of the housing of the servomotor unit. The yieldable control link comprises an actuating pin or rod 104 having a ball end 106 which abuts the end of the valve spool 50 and which is held within the longitudinal opening 52 of the valve sleeve 48 by means of wire snap ring 108. The outer end of the rod 104 is received within one end of an actuating sleeve 110, and a threaded plug 112 is screwed into the outer end of the actuating sleeve 110 for the reception of linkage that is connected to the brake pedal lever of the vehicle. From the above description of the control valve structure C, it will be apparent that the hydraulic pressure which is supplied to actuate the power piston B also supplies a reactive force upon the inner end of the valve spool 50 tending to move it to its normal or released position shown in the drawing. In order that the maximum hydraulic pressure which can be applied to the power piston B will be limited to a predetermined value, a compression spring 114 is interpositioned between the actuating sleeve 110 and the actuating rod 104 to limit the force which the operator can supply to the valve spool 50 and in turn thereby limit the maximum hydraulic pressure which can be delivered against the power piston B. Compression spring 114 also serves the purpose during power actuation of permitting the spool 50 to shift back and forth slightly without transferring objectionable movement to the foot of the operator. A suitable shoulder 116 is provided on the rod 104 adjacent the ball end 106, and the annular washer 118 is biased thereagainst by one end of the coil spring 114. The other end of the coil spring 114 is positioned against a similar annular washer 120 which in turn is abutted by the threaded plug 112. The rod 104 is prevented from being withdrawn from the sleeve 110 by means of a snap ring 122 which abuts the washer 120, and by a similar snap ring 124 which abuts the washer 120, and by a similar snap ring 124 which prevents the actuating sleeve 110 from being withdrawn past the inner annular washer 118.

In the normal condition of the servomotor unit shown in the drawing, pressure from a hydraulic pump is admitted to the groove 58 in the valve sleeve 48 and thence passes directly to the flow through groove 60 to an open-center hydraulic steering unit without producing any appreciable pressure drop across the control valve structure C. Actuation of the unit is had by depressing a foot pedal lever, not shown, to move the yieldable control link D inwardly causing force to be transmitted through the compression spring 114 to the actuating rod 104 to thereby produce inward movement of the valve spool 50 with respect to the valve sleeve 48. As previously indicated the control recess 76 is continually in communication with the face of the power piston B through drillings 80 and 82, and the initial movement of valve spool 50 closes off the exhaust groove 56 from the control recess 76 and thereafter opens the control recess 76 to the inlet groove 58 of the valve to communicate the inlet groove 58 to the face of the power piston B. As previously indicated, the land 74 is of such an axial length that it will remain slightly open with respect to the land 78 of the valve sleeve 48 when its other end just becomes underlapped with respect to the inlet groove 58, so that if back pressure is being produced in the flow through groove 60 by a power steering unit, this pressure will be immediately communicated to the control recess 76 and hence to the power piston B when the land 74 becomes underlapped with respect to the groove 58. If back pressure is not being produced in the flow through groove 60, continued inward movement of the valve spool 50 with respect to the valve sleeve 48 causes the space between the land 74 and the sidewall portion 78 to decrease and thereby restrict flow through the valve to create a back pressure in the inlet groove 58, which then is transmitted through the control recess 76 and drillings 80 and 82 to the top face of the power piston B. As previously indicated, the control drilling 82 opens into the end of the valve spool 50 such that the control pressure produces a reaction against the valve spool which reaction pressure will be transmitted back through the rod 104 and actuating sleeve 110 to apprise the operator of the amount of pressure which is being delivered to the power piston B. It has further been indicated that the control pressure passing through the control drilling 82 must flow through an orifice drilling 92 in the check valve and orifice arrangement 84 so that a rapid build-up in pressure against the power piston B will not be produced. An increase in pressure upon the power piston B causes it to be forced inwardly into the fluid pressurizing chamber A, thereby compressing springs 30 and 32, and displacing fluid out through the residual pressure check valve structure 20 to the braking system which the unit operates.

A safety feature is provided in the unit by incorporation of the compression spring 114 which limits the amount of valve actuating force that can be transmitted to the valve spool 50, such that after a predetermined amount of valve actuating force has been transmitted to the valve spool 50, the coil spring 114 will yield under the reaction pressure, previously described, that is produced upon the valve spool 50. Yielding of the compression spring 114 will permit the valve spool 50 to move towards its released condition under the reaction pressures to cause the land 74 to close off the control recess 76 with respect to the inlet groove 58, and thereafter bleed sufficient control pressure out through the exhaust groove 56 to maintain a pressure against the power piston B which corresponds to the maximum thrust that can be transmitted thorugh the coil spring 114. The maximum force that can be transmitted through the compression spring 114 is in turn limited by the force that is required to compress the spring 114 sufficiently to accomplish the above referred to valve movement, when the end of the actuating sleeve 110 has been moved into engagement with the valve sleeve 48.

A retraction of the yieldable control link D will, of course, permit the land 74 to become underlapped with respect to the sidewall portion 78. If no back pressure is being supplied against the flow through groove 60 by the downstream power steering unit, this underlap will bleed pressure from the inlet groove 58 and hence the control recess 76, inasmuch as the land 74 is underlapped with respect to the outer edge of the groove 58 at this time, and the pressure against the power piston B is thereby reduced. If back pressure is being held against the groove 60, it will be necessary to further retract the yieldable control link D to permit the land 74 to become lapped with respect to the outer end of the inlet groove 58 before a reduction of pressure can be experienced within the control recess 76. It will be understood that during power operation of the unit, control pressure upon the inner end of the valve sleeve 48 holds it stationary into abutment with the wire snap ring 126 so that the only travel that is required of the yieldable control link D is that necessary to stroke the valve spool 50 with respect to the stationary valve sleeve 48. A complete release of pressure upon the yieldable control link D will, of course, permit the valve land 72 to become underlapped with the exhaust groove 56, the ball valve 96 to move off of its seat in the part 86, and fluid to rapidly flow from the power chamber 38 through drillings 80 and 82, recess 76 and the exhaust groove 56.

During an emergency when hydraulic pressure does not exist to power operate the unit, the unit can be operated manually by forcing the yieldable control link D into the servomotor unit in the same manner previously described for its power actuation. Since now no pressure will exist against the end of the valve spool 50, the valve spool 50 will be moved inwardly easily against the slight amount of force exerted by the coil spring 102 to permit the inner end of the actuating sleeve 110 to abut the outer end of the valve sleeve 48. Thereafter continued inward movement of the actuating sleeve 110 causes the valve sleeve 48 to be moved inwardly against the face of the power piston B, to thereafter mechanically force the power piston B into the fluid pressurizing chamber 12 to cause fluid to be displaced therefrom in the same manner as described above for the unit's power operation. In order that a vacuum will not be created within the power chamber 38 during manual actuation of the power piston B, communication of the power chamber 38 is had with the exhaust connection 54 through a suitable check valve structure 128. The check valve structure 128 shown in the drawing is formed by means of a boring that is counterbored to provide a valve seat against which a ball valve 132 abuts to prevent pressure flow out of the chamber 38 during the power operation. During manual actuation, the ball valve 132 is easily lifted off its seat by flow from exhaust connection 54 into the power chamber 38, and the ball valve 132 is retained within its counterbore by means of a welch plug 134 having suitable openings therethrough. The portion of the power chamber 38 forwardly of the piston head 36 is also communicated to the exhaust connection 54 through suitable drillings in the housing section 40.

In order to compensate for any leakage which may occur in the hydraulic system to which the outlet 16 is communicated, a suitable drilling 136 is provided between the front and back faces of the power piston B to permit fluid flow from the power chamber 38 to the fluid pressurizing chamber 12 during the released condition of the servomotor unit. Control of flow through the drilling 136 is had by means of a check valve structure 138 in the passage 136. The end of the passage 136 adjacent the valve spool 50 is counterbored to provide a shoulder 140 against which an annular valve seat member 142 is held by an annular member 144 which is simultaneously deformed into a groove 146 in the sidewalls of the counterbored section, and deformed against the valve seat member 142 to hold it in sealing engagement with the shoulder 140. A suitable opening 148 is provided through the valve seat member 142, and the inner end of the opening 148 is chamfered to provide a valve seat 150 against which a ball valve 152 abuts to prevent flow from the chamber 12 to the chamber 38 during actuation of the unit. In order that the ball valve 152 will be held out of engagement with its seat 150 during the released condition of the servomotor unit, a stem 154 is resistance welded to the ball 152 and extends through the opening 148 to abut the end of the chamber 38 and hold the ball valve 152 off of its seat when the power piston B is in its normal released condition adjacent the valve spool 50. Actuation of the unit, of course, either manually or with power, causes the piston B to move away from the end of the power chamber 38, and thereby permits the ball valve 152 to be forced against its seat 150 by reason of the greater hydraulic pressure that is produced in the fluid pressurizing chamber 12 than is produced in the power chamber 38.

While the invention has been described in considerable detail, I do not wish to be limited to the exact construction shown and described, and it is our intention to cover hereby all novel adaptations, modifications and arrangements thereof which come within the practice of those skilled in the art to which the invention relates.

We claim:

1. A fluid pressure servomotor comprising: a body member having an axially extending power chamber therein, a movable wall in said power chamber constructed and arranged to be driven toward one end of said body member, said body member also having a generally axially extending valve chamber adjacent the other end thereof which valve chamber opens into and is generally concentric with said power chamber, a valve sleeve in sliding engagement with the sidewalls of said valve chamber and capable of moving into abutment with said movable wall, abutment means limiting movement of said valve sleeve away from said movable wall, a valve spool in the central chamber of said valve sleeve, inlet means for said body member providing fluid pressure communication within said body member, outlet means for fluid pressure from said body member, said valve sleeve and valve spool constituting a coacting valve structure which communicates said outlet means to the portion of said body member located between said sleeve and said movable wall when said valve spool is in a normal position in said sleeve and to communicate said inlet means to said portion of said body member located between said sleeve and said movable wall when said valve spool is moved to an actuating position in said sleeve located in the direction of said movable wall from said normal position, means for biasing said valve spool toward its normal position, and actuating means projecting out of said sleeve for moving said valve spool, said actuating means including a lost motion connection for driving said valve sleeve into engagement with said movable wall, and said lost motion connection being greater in length than the movement of said spool from its normal to its actuating position; said means for biasing said valve spool being effective to retain said sleeve against its abutment during power actuation of the movable wall during actuation of said valve spool through said lost motion connection and further movement of said actuating means effecting abutment of said sleeve with said movable wall to obtain displacement of said movable wall under power failure.

2. A fluid pressure servomotor comprising: a body member having an axially extending power chamber therein, a movable wall in said power chamber constructed and arranged to be driven toward one end of said body member, said body member also having a generally axially extending valve chamber adjacent the other end thereof which valve chamber opens into and is generally concentric with said power chamber, a valve sleeve in sliding engagement with the side-walls of said valve chamber and capable of moving into abutment with said movable wall, abutment means limiting movement of said valve sleeve away from said movable wall, said body member having means forming an outlet connection, means forming pressure fluid inlet, and means forming a flow through fluid path, said valve sleeve having a central chamber therein, a valve spool in said central chamber and having recesses therein which when said spool is in its normal position communicates said outlet means to the portion of said body member between said sleeve and said movable wall while also communicating said means forming an inlet to said means forming a flow through path, and which when in an actuating position located in the direction of said movable wall from said normal position diverts at least a portion of fluid flow from said inlet means to said portion of said body member between said valve sleeve and said movable wall, said valve spool having an end adjacent said movable wall for receiving fluid pressure effective to bias it toward its normal position, and actuating means projecting out of said sleeve for moving said valve spool, said actuating means including a lost motion connection for driving said valve sleeve into engagement with said movable wall, and said lost motion connection having a greater amount of lost motion than the movement of said spool from its normal to its actuating position.

3. A unit comprising: a housing having fluid inlet port means and fluid outlet port means, said housing having a valve assembly chamber therein communicated with a variable volume fluid chamber, said valve assembly comprising two relatively movable valve members slidably mounted in said valve assembly chamber, passage means communicating said valve assembly with said inlet and outlet port means, stop means operatively connected to said housing constructed for engagement by one of said valve members, means urging said one valve member into engagement with said stop means, said valve assembly being so arranged and constructed that when the other of said valve members is in actuating position relative to said one valve member fluid flow from said inlet port means will be communicated to said variable volume chamber and when in normal portion of said other valve member relative to said one valve member fluid flow communication from said inlet port means to said variable volume fluid chamber is cut off and said variable volume chamber is communicated with said outlet port means, movable means operatively connected to said valve members for moving said one valve member when said other valve member has traveled a predetermined distance relative to said one valve member.

4. In a fluid pressure motor: a housing having fluid inlet port means and fluid outlet port means, said housing having a longitudinally extending chamber therein, a valve assembly located at the rear of said chamber comprising two relatively movable valve members slidably mounted in said chamber, passage means communicating said valve assembly with said inlet and outlet port means, a pressure responsive member slidably mounted in the front of said chamber, stop means operatively connected to said housing constructed for engagement by one of said valve members, means urging said one valve member rearwardly into engagement with said stop means, said valve members being so arranged and constructed that when the other of said valve members is in actuating position relative to said one valve member fluid flow from said inlet port means will be communicated to the rear of said pressure responsive member thereby providing a fluid force acting on said pressure responsive member for moving said pressure responsive member forwardly, and when in normal position of said other valve member relative to said one valve member fluid flow communication from said inlet port means to the rear of said pressure responsive member is cut off and said rear of said pressure responsive member is communicated with said outlet port means, means at the front end of said one valve member for engaging the rear of said pressure responsive member, movable means operatively connected to said valve members for transferring force to said one valve member for moving said pressure responsive member when said other valve member has traveled a predetermined distance relative to said one valve member.

5. The structure as recited in claim 4, wherein said movable means comprises actuating means operatively connected to said other valve member for moving the same, said actuating means having a lost motion connection with said one valve member for moving the same away from said stop means and thereby move said pressure responsive member forwards.

6. A unit comprising: a housing having fluid inlet port means and fluid outlet port means, said housing having a valve assembly chamber therein communicated with a variable volume fluid chamber, said valve assembly comprising a first valve member slidably mounted in said chambers and a second valve member slidably mounted within said first valve member, passage means communicating the interior of said first valve member with said inlet and outlet port means, stop means operatively connected to said housing constructed for engagement by said first valve member, means urging said first valve member into engagement with said stop means when said second valve member is in normal position, said valve assembly being so arranged and constructed that when said second valve member is in actuating position relative to said first valve member fluid flow from said inlet port means will be communicated to one end of said first valve member and to said variable volume chamber, thereby providing a fluid force acting on said end of said first valve member for urging said first valve member against said stop means, and when in normal position of said second valve member relative to said first valve member fluid flow communication from said inlet port means to said one end of said first valve member and said variable volume fluid chamber is cut off and said one end of said first valve member and said variable volume chamber is communicated with said outlet port means, movable means operatively connected to said valve members for moving said first valve member when said other valve member has traveled a predetermined distance relative to said first valve member.

7. In a fluid pressure motor: a housing having fluid inlet port means and fluid outlet port means, said housing having a longitudinally extending chamber therein, a valve assembly located at the rear of said chamber comprising a first valve member slidably mounted in said chamber and a second valve member slidably mounted within said first valve member, passage means communicating the interior of said first valve member with said inlet and outlet port means, a pressure responsive member slidably mounted in the front portion of said chamber, stop means operatively connected to said housing constructed for engagement by said first valve member, means urging said first valve member rearwardly into engagement with said stop means when said second valve member is in normal position, said valve assembly being so arranged and constructed that when said second valve member is in actuating position relative to said first valve member fluid flow from said inlet port means will be communicated to the front end of said first valve member and to the rear of said pressure responsive member thereby providing a fluid force acting on said first valve member front end for urging said first valve member rearwardly against said stop means and providing a fluid force acting on said pressure responsive member for moving said pressure responsive member forwardly, and when in normal position of said second valve member relative to said first valve member fluid flow communication from said inlet port means to said front end of said first valve member and the rear of said pressure responsive member is cut off and said front end of said first valve member and the rear of said pressure responsive member is communicated with said outlet port means, means at the front end of said first valve member for engaging the rear of said pressure responsive member, movable means operatively connected to said valve members for transferring force to said first valve member for moving said pressure responsive member when said other valve member has traveled a predetermined distance relative to said first valve member.

8. The structure as recited in claim 7, wherein said movable means comprises actuating means operatively connected to said second valve member for moving the same, said actuating means having a lost motion connection with said second valve member for moving the same away from said stop means and thereby move said pressure responsive member forwards.

9. The structure as recited in claim 8 wherein said means urging said first valve member rearwardly into engagement with said stop means when said second valve member is in normal position comprises spring means urging said pressure responsive member rearwardly into engagement with said front end of said first valve member.

10. The structure as recited in claim 9 wherein said spring means engages the front of said pressure responsive member.

11. The structure as recited in claim 10 wherein means are provided for communicating pressure acting on the rear of said pressure responsive member to the front end of said second valve member whereby said pressure is transferred to said actuating means by said second valve member.

12. The structure as recited in claim 10 wherein said first valve member comprises a valve sleeve having an annular inlet port and an annular outlet port in the interior wall thereof communicated with said housing inlet and outlet port means, respectively, said second valve member comprising a spool valve member having at least one land so arranged to cooperate with said annular grooves for effecting the above said functions when said spool valve member is in normal and actuating positions.

13. The structure as recited in claim 10 wherein said housing has a second outlet port means, said first valve member comprising a hollow valve sleeve having an annular inlet port and two annular outlet ports in the interior wall thereof, means communicating said annular inlet port with said housing inlet port means and each of said annular outlet ports with a respective one of said housing outlet port means, said second valve member comprising a spool valve member having lands so arranged to cooperate with said annular grooves for effecting the above said functions when said spool valve member is in normal and actuating positions in addition to providing fluid flow from said inlet port means to said second outlet port means via said annular inlet port and the respective annular outlet port of said second outlet port means when said spool valve member is in normal position.

14. The structure as recited in claim 13 wherein means are provided for communicating pressure acting on the rear of said pressure responsive member to the front end of said spool valve whereby said pressure is transferred to said actuating means by said spool valve.

15. The structure as recited in claim 14 wherein said actuating means and the lost motion connection thereof with said valve sleeve comprises a rod engaging the rear end of said spool valve member and extending in a direction rearwardly therefrom, a longitudinal sleeve encompassing said rod, said rod and longitudinal sleeve being interconnected for relative movement therebetween after a predetermined force has been reached, the front end of said sleeve being spaced longitudinally from the rear end of said valve sleeve whereby the front end of said longitudinal sleeve engages the valve sleeve to move the same and which valve sleeve in turn engages the rear of said pressure responsive member to move the same when said longitudinal sleeve is moved relative to said valve sleeve beyond the normal displacement required thereof for hydraulic actuation of said pressure responsive member.

16. A unit comprising: a housing providing an expansible chamber therein, a fluid pressure responsive member received in said chamber, a valve assembly chamber communicated with said expansible chamber, said valve assembly including two relatively movable valve members, said housing having inlet port means and two outlet port means, passage means communicating said inlet and outlet port means to said valve members, said valve assembly being so constructed and arranged that in operating position of one of said valve members relative to the other of said valve members said inlet port means is communicated to said expansible chamber to provide fluid flow thereto for moving said pressure responsive member and when in normal position of said one valve member relative to said other valve member communicates said expansible chamber and pressure responsive member to one of the outlet port means and communicates said inlet port means with the other outlet port means, said other valve member having means for operatively engaging said pressure responsive member, movable means operatively connected to said valve members for moving said other valve member when said one valve member has traveled a predetermined distance relative to said other valve member.

17. The structure as recited in claim 16 wherein said movable means comprises actuating means operatively connected to said one valve member for moving the same, said actuating means having a lost motion connection with said other valve member for moving the same and thereby said pressure responsive member.

18. A unit comprising: a housing providing a variable volume chamber therein, a valve assembly chamber communicated with said variable volume chamber, said valve assembly including two relatively movable valve members, said housing having inlet port means and two outlet port means, passage means communicating said inlet and outlet port means to said valve members, said valve assembly being so constructed and arranged that in operating position of one of said valve members relative to the other of said valve members said inlet port means is communicated to said variable volume chamber and when in normal position of said one valve member relative to said other valve member communicates said variable volume chamber to one of the outlet port means and communicates said inlet port means with the other outlet port means, movable means operatively connected to said valve members for moving said other valve member when said one valve member has traveled a predetermined distance relative to said other valve member.

19. A unit comprising: a housing providing a variable volume chamber therein, a valve assembly chamber communicated with said variable volume chamber, said valve assembly including two relatively movable valve members, said housing having inlet port means and two outlet port means, passage means communicating said inlet and outlet port means to said valve members, said valve assembly being so constructed and arranged that in operating position of one of said valve members relative to the other of said valve members said inlet port means is communicated to said variable volume chamber and when in normal position of said one valve member relative to said other valve member communicates said variable volume chamber to one of the outlet port means and communicates said inlet port means with the other outlet port means, actuating means for moving said one valve member from normal to operating position, movable means operatively connected to said valve members for moving said other valve member when said one valve member has traveled a predetermined distance relative to said other valve member.

20. A unit comprising: a housing having fluid inlet port means and fluid outlet port means, said housing having a valve assembly chamber therein communicated with a variable volume fluid chamber, said valve assembly comprising two relatively movable valve members slidably mounted in said valve assembly chamber, passage means communicating said valve assembly with said inlet and outlet port means, stop means operatively connected to said housing constructed for engagement by one of said valve members, means urging said one valve member into engagement with said stop means, said valve assembly being so arranged and constructed that when the other of said valve members is in actuating position relative to said one valve member fluid flow from said inlet port means will be communicated to said variable volume chamber and when in normal position of said other valve member relative to said one valve member fluid flow communication from said inlet port means to said variable volume fluid chamber is cut off and said variable volume chamber is communicated with said outlet port means, actuating means for moving said other valve member from normal to actuating position, movable means operatively connected to said valve members for moving said one valve member when said other valve member has traveled a predetermined distance relative to said one valve member.

21. The structure as recited in claim 18 wherein said movable means comprises actuating means operatively connected to said one valve member for moving the same, said actuating means having a lost motion connection with said other valve member for mechanically moving said other valve member when said one valve member has traveled a predetermined distance relative to said other valve member.

References Cited in the file of this patent
UNITED STATES PATENTS

| | | |
|---|---|---|
| 2,331,238 | Schnell | Oct. 5, 1943 |
| 2,360,578 | Porter | Oct. 17, 1944 |
| 2,517,005 | MacDuff | Aug. 1, 1950 |
| 3,101,032 | Randol | Aug. 20, 1963 |

UNITED STATES PATENT OFFICE

CERTIFICATE OF CORRECTION

Patent No. 3,173,339                  March 16, 1965

Lester J. Larsen et al.

It is hereby certified that error appears in the above numbered patent requiring correction and that the said Letters Patent should read as corrected below.

Column 8, line 27, for "portion" read -- position --; column 10, lines 10, 16, and 25, for the claim reference numeral "10", each occurrence, read -- 8 --.

Signed and sealed this 14th day of September 1965.

(SEAL)
Attest:

ERNEST W. SWIDER                                EDWARD J. BRENNER
Attesting Officer                                  Commissioner of Patents